United States Patent
Schinabeck et al.

(10) Patent No.: US 8,906,986 B2
(45) Date of Patent: Dec. 9, 2014

(54) ADDITIVE FOR BUILDING PRODUCT MIXTURES CONTAINING FLOW AGENTS

(75) Inventors: Michael Schinabeck, Altenmarkt (DE);
Frank Dierschke, Oppenheim (DE);
Manfred Bichler, Engelsberg (DE);
Silke Flakus-Taube, Ebersberg (DE);
Stefan Friedrich, Garching (DE)

(73) Assignee: BASF Construction Solutions GmbH, Trostberg (DE)

( * ) Notice: Subject to any disclaimer, the term of this patent is extended or adjusted under 35 U.S.C. 154(b) by 0 days.

(21) Appl. No.: 13/989,131

(22) PCT Filed: Nov. 29, 2011

(86) PCT No.: PCT/EP2011/071276
§ 371 (c)(1),
(2), (4) Date: Jul. 31, 2013

(87) PCT Pub. No.: WO2012/076365
PCT Pub. Date: Jun. 14, 2012

(65) Prior Publication Data
US 2014/0066547 A1   Mar. 6, 2014

(30) Foreign Application Priority Data
Dec. 9, 2010   (EP) .................................. 10194368

(51) Int. Cl.
| | | |
|---|---|---|
| C04B 24/26 | (2006.01) | |
| C08K 3/02 | (2006.01) | |
| A61K 8/73 | (2006.01) | |
| C08K 5/17 | (2006.01) | |
| C08K 5/09 | (2006.01) | |
| C02F 1/52 | (2006.01) | |
| C09D 5/02 | (2006.01) | |
| C08L 39/00 | (2006.01) | |
| C08F 26/00 | (2006.01) | |
| C04B 28/14 | (2006.01) | |
| C08F 220/60 | (2006.01) | |
| C08F 226/04 | (2006.01) | |
| C08F 220/34 | (2006.01) | |
| C04B 24/16 | (2006.01) | |
| C04B 111/00 | (2006.01) | |
| C04B 103/40 | (2006.01) | |
| C08F 220/28 | (2006.01) | |
| C08F 220/04 | (2006.01) | |
| C08F 216/18 | (2006.01) | |

(52) U.S. Cl.
CPC ........... *C04B 24/2694* (2013.01); *C04B 28/145* (2013.01); *C04B 2111/0062* (2013.01); *C08F 220/60* (2013.01); *C04B 2111/00517* (2013.01); *C04B 2103/408* (2013.01); *C08F 2220/286* (2013.01); *C08F 220/04* (2013.01); *C04B 24/2658* (2013.01); *C08F 226/04* (2013.01); *C08F 216/18* (2013.01); *C08F 220/28* (2013.01); *C08F 220/34* (2013.01); *C04B 24/165* (2013.01)
USPC .................. 524/5; 524/555; 524/239; 524/80; 524/27; 524/320; 524/321; 524/521; 526/312

(58) Field of Classification Search
CPC .............. C04B 24/165; C04B 24/2658; C04B 24/2694; C04B 2111/0062; C08F 220/34; C08F 226/06
USPC ......... 524/5, 555, 239, 80, 27, 320, 321, 521; 526/312
See application file for complete search history.

(56) References Cited

U.S. PATENT DOCUMENTS

| | | |
|---|---|---|
| 3,686,133 A | 8/1972 | Hattori et al. |
| 4,430,469 A | 2/1984 | Buerge et al. |
| 4,501,839 A | 2/1985 | Buerge et al. |
| 4,725,665 A | 2/1988 | Pieh et al. |
| 5,750,634 A | 5/1998 | Albrecht et al. |
| 6,352,952 B1 | 3/2002 | Jardine et al. |
| 6,555,683 B1 | 4/2003 | Weichmann et al. |
| 7,261,772 B1 | 8/2007 | Schwartz et al. |
| 2006/0276356 A1* | 12/2006 | Panandiker et al. .......... 510/100 |
| 2007/0161724 A1 | 7/2007 | Moraru et al. |
| 2010/0087569 A1 | 4/2010 | Friedrich et al. |
| 2010/0168282 A1 | 7/2010 | Becker et al. |
| 2011/0136944 A1 | 6/2011 | Bogdan et al. |

FOREIGN PATENT DOCUMENTS

| | | |
|---|---|---|
| DE | 2 007 603 | 2/1971 |
| DE | 44 11 797 | 10/1995 |
| DE | 196 09 614 | 9/1996 |
| DE | 195 38 821 | 10/1996 |
| EP | 0 059 353 A1 | 9/1982 |
| EP | 0 214 412 A1 | 3/1987 |
| WO | 2005/075529 A2 | 8/2005 |
| WO | 2008/049549 A2 | 5/2008 |
| WO | 2008/141844 A1 | 11/2008 |

* cited by examiner

*Primary Examiner* — William Cheung
(74) *Attorney, Agent, or Firm* — Fulbright & Jaworski LLP

(57) ABSTRACT

Claimed is a cationic copolymer and also its use as an admixture agent for building product systems, especially based on calcium sulfate. The copolymers of the invention effectuate accelerated setting behavior in clay-containing as well as non-clay-containing gypsums and they enable uncurtailed water reduction performance by dispersant agents used at the same time with the copolymers. The clay fractions in the gypsum system are masked by the cationic copolymer, and so the building product mixture exhibits properties of a building product mixture not containing clay. The copolymers are used as a formulation and also together with retarders.

28 Claims, No Drawings

ADDITIVE FOR BUILDING PRODUCT MIXTURES CONTAINING FLOW AGENTS

This application is a §371 of International Application No. PCT/EP2011/071276 filed Nov. 29, 2011, and claims priority from European Patent Application No. 10194368.6 filed Dec. 9, 2010.

The present invention concerns a novel copolymer and use thereof as an admixture agent for building product systems.

It is known that inorganic binders are often admixed with admixture agents in the form of dispersants to improve the workability, i.e. kneadability, spreadability, sprayability, pumpability or flowability, of the binders. Such admixture agents are capable of breaking up agglomerates formed from solid materials, of dispersing the particles formed and thereby improving the workability. This effect is also utilized in a specific manner in the manufacture of building product mixtures containing hydraulic binders such as cement or lime or other inorganic binders, for example those based on calcium sulfate.

To convert these building product mixtures based on the binders mentioned into a ready-to-use, workable form, it is generally necessary to use significantly more mixing water than would be necessary for the subsequent hydration/hardening step. The excess water, which later evaporates, forms voids in the hardened body of building product which lead to significantly worsened mechanical strengths and stabilities.

Admixture agents that are used to reduce this excess proportion of water for a given working consistency and/or to improve the workability for a given water/binder ratio are generally referred to as water-reducing or flow agents. As is apparent from WO 2005/075529 for example, such agents are in practice particularly copolymers formed by free-radical copolymerization of acid monomers with polyether macromonomers (flow agents based on polycarboxylate ethers).

It is not rare for building product formulations to combine use of the inorganic binder with the use of aggregates that have a comparatively high adsorptive fraction. "Adsorptive fraction of an aggregate" is to be understood as referring to those particles in the aggregate which more particularly have a high surface area and/or large porosity and/or are in the form of clay mineral and the surfaces of which are attractive to flow agents based on polycarboxylate ethers. Thus the flow agents based on polycarboxylate ethers interact strongly with the adsorptive aggregates and/or become irreversibly incorporated in the pores of the adsorptive aggregates, and so the flow agent molecules are no longer available for dispersing the particles of the inorganic binder, especially the cement or gypsum particles. This ultimately has the undesirable consequence that the effect of the polycarboxylate ether-based on flow agent is greatly reduced, which adversely affects the workability of the building product formulation and/or the mechanical quality of the cured building product formulation.

When clay-containing varieties of gypsum and especially natural gypsum are used, appreciable amounts of the dispersant (flow agent) used are observed to become adsorbed/absorbed by the clay mineral similarly to the adsorptive fractions of an aggregate and hence is no longer available to plasticize the gypsum hemihydrate in the gypsum mass.

One attempt to solve this problem involves the use of so-called sacrificial substances to outcompete the dispersant in binding to the surface of clay particles and thereby either mask these clay particles, denying them access to the dispersant, or substantially flocculate the clay particles.

U.S. Pat. No. 6,352,952 B1 describes aqueous cement compositions containing EO/PO-containing comb polymers as superplasticizers as well as clays of the smectite type. The clay fractions are also stated to be capable of absorbing the plasticizer by swelling. To prevent this absorption, inorganic cations, organic cations, polar organic molecules or clay-specific dispersant agents are used. Phosphates, poly(meth)acrylates and gluconates are mentioned in particular. However, systems of this type cannot be used in gypsum-containing masses, since they retard their setting too much.

U.S. Pat. No. 7,261,772 B1 describes a gypsum composition which, in addition to water, gypsum and clay, also contains a polyoxyalkylene, an amine compound and a comb copolymer. The comb copolymer subsumes repeating units of polyether macromonomers and acrylic monomers, i.e., polycarboxylate ethers in the broader sense. The presence of the amine component is mandatory. However, this is disadvantageous in that volatile amines tend to constitute a severe odor nuisance at elevated temperatures as typically used in the drying of gypsumboard. Therefore, amines are only of limited usefulness as clay-modifying component for gypsum systems.

Polycarboxylate ethers generally lead to retarded setting of gypsum-based binders, especially at comparatively high dosages. A further problem with the use of dispersant agents for natural gypsums is the contamination of the latter with clay because clay greatly lowers/eliminates the water-reducing ability of dispersant agents.

WO 2008/049549 A2 discloses hydrophobic modified cationic copolymers which have at least three mutually different structural units and which combine with anionic surfactants to effectuate improved water retention in aqueous building product systems. Owing to their macromonomeric structural units, copolymers of this type, structural unit a) of which may include up to 15 mol % of a cationic structural unit derived from N,N-dimethyl diallylammonium chloride and N,N-diethyldiallylammonium chloride, display a pronounced associatively thickening character.

It is an object of the present invention to provide a novel polymeric additive for building product mixtures which, after addition of but comparatively little mixing water, provides a readily workable building product formulation in the form of a gypsum slurry which, after curing, has good mechanical properties especially even when the gypsums have a comparatively high adsorptive fraction in the form of clays for example.

We have found that this object is achieved by a copolymer consisting of a) 16 to 95 mol % of a cationic structural unit (A).

b) 5 to 55 mol % of a macromonomeric structural unit (B), and c) up to 80 mol % of a structural unit (C), d) up to 80 mol % of a structural unit (D) other than the structural unit (C), wherein the structural unit (A) includes at least one unit of the following general formulae (I) and/or (II):

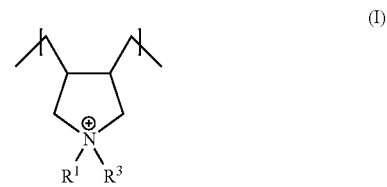

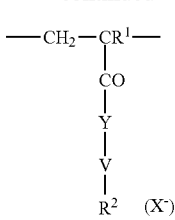

(II)

where
R$^1$ in each occurrence is the same or different and represents hydrogen and/or methyl,

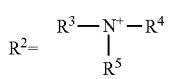

R$^3$, R$^4$ and R$^5$ in each occurrence are the same or different and each independently represent hydrogen, an aliphatic hydrocarbonaceous moiety having 1 to 20 carbon atoms, a cycloaliphatic hydrocarbonaceous moiety having 5 to 8 carbon atoms and/or aryl having 6 to 14 carbon atoms or polyethylene glycol (PEG), Y in each occurrence is the same or different and represents oxygen, —NH and/or —NR$^3$, V in each occurrence is the same or different and represents —(CH$_2$)$_x$—,

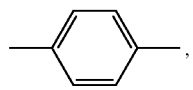

and/or

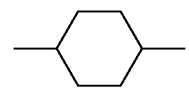

where
x in each occurrence is the same or different and represents an integer from 1 to 6,
X in each occurrence is the same or different and represents a halogen atom, C$_1$- to C$_4$-alkyl sulfate and/or C$_1$- to C$_4$-alkyl sulfonate.

The copolymer concerning the invention is essentially a cationic comb polymer that does not display retarding properties in clay-containing as well as non-clay-containing gypsums and does not have an adverse effect on any possible acceleration of setting characteristics. The cationic comb polymer further enable uncurtailed water reduction performance by a dispersant agent used at the same time with the cationic comb polymer in clay-containing gypsum in particular. The clay in the gypsum are masked by the cationic polymer, and so the building product mixture exhibits properties of a building product mixture not containing clay.

The expression "CaSO$_4$ based" is to be understood in the present context as meaning calcium sulfate in its anhydrous and hydrate forms, for example gypsum, anhydrite, calcium sulfate dihydrate and calcium sulfate hemihydrate.

The term "gypsum" is used in the present context interchangeably with calcium sulfate, while calcium sulfate can be present in its different anhydrous and hydrated forms with and without water of crystallization. Natural gypsum comprises essentially calcium sulfate dihydrate. The naturally occurring calcium sulfate free of water of crystallization is known as "anhydrite". In addition to its naturally occurring forms, calcium sulfate is a typical by-product of industrial processes, and then is referred to as "synthetic gypsum". Flue gas desulfurization is a typical example of a synthetic gypsum from industrial processes. Synthetic gypsum is also by-produced by phosphoric acid or hydrofluoric acid production processes, in which case hemihydrated forms such as CaSO$_4$×½H$_2$O are produced in these cases for example. Typical gypsum (CaSO$_4$×2H$_2$O) can be calcined by removing the water of hydration. α- or β-Hemihydrate are typical products of the various calcination processes. β-Calcium sulfate hemihydrate results from rapid heating in open vessels where the water evaporates quickly at the same time to leave voids behind. α-Hemihydrate forms when gypsum is dehydrated in sealed autoclaves. The crystal form in this case is relatively impervious and hence the water requirements of this binder are lower than for β-hemihydrate. On the other hand, gypsum hemihydrate rehydrates on addition of water to form dihydrate crystals. The complete hydration of gypsum typically takes place within a few minutes to a few hours, which results in a shortened working period compared with cements, which take several hours to days to fully hydrate. These properties make gypsum an attractive alternative to cements as binders in various fields of application. In addition, fully cured gypsum products exhibit pronounced hardness and compressive strength.

Calcium sulfate hemihydrate forms at least two crystal forms: α-calcined gypsum is typically dehydrated in sealed autoclaves. The choice for numerous applications is β-calcined gypsum because its availability is better and it has numerous advantages from economic points of view. However, these advantages are nullified to some extent by the fact that β-calcined gypsum has higher water requirements for conversion into slurries that are flowable at all. In addition, dried products of gypsum tend to exhibit a certain infirmity, which are attributable to residual quantities of water which have remained in the crystal matrix during curing. Therefore, corresponding products exhibit a lower hardness than gypsum products produced using small amounts of mixing water.

An "adsorptive fraction" in the form of clays for example is understood by the present invention as meaning swellable and more particularly water-swellable clays, for example smectites, montmorillonites, bentonites, vermiculites, hectorites and also kaolins and feldspars.

Altogether, the processing of gypsum can be positively influenced by the addition of flow agents.

In one preferred version, the present invention provides that the copolymer contains the cationic structural unit (A) in fractions of 20 to 95 mol % and more preferably of 40 to 80 mol %, and/or the macromonomeric structural unit (B) in fractions of 10 to 40 mol %.

According to the present invention, the structural unit (A) is preferably the polymerization product selected from the series of at least one monomer species [2-(acryloyloxy)ethyl] trimethyl ammonium chloride, [2-(acryloylamino)ethyl]-trimethylammonium chloride, [2-(acryloyloxy)ethyl]trimethylammonium methosulfate, [2-(methacryloyloxy)ethyl] trimethylammonium chloride, [2-(methacryloyloxy)ethyl]-trimethylammonium methosulfate, [3-(acryloylamino)propyl]trimethylammonium chloride, [3-(methacryloylamino)propyl]trimethylammonium chloride and/or diallyldimethylammonium chloride (DADMAC).

The macromonomeric structural unit (B) is preferably represented by the general formulae (IIIa) and/or (IIIb) in the polymer:

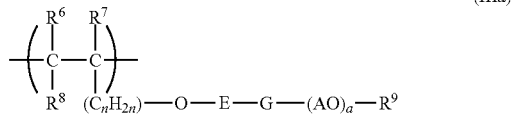

(IIIa)

where
R$^6$, R$^7$ and R$^8$ in each occurrence are the same or different and each independently represent H and/or branched or unbranched C$_1$-C$_4$ alkyl;
E in each occurrence is the same or different and represents branched or unbranched C$_1$-C$_6$ alkylene, cyclohexyl, CH$_2$—C$_6$H$_{10}$, ortho-, meta- or para-substituted C$_6$H$_4$ and/or a unit not present;
G in each occurrence is the same or different and represents O, NH and/or CO—NH with the proviso that when E is a unit not present, G is also a unit not present;
A in each occurrence is the is the same or different and represents C$_x$H$_{2x}$ where x=2, 3, 4 and/or 5 (preferably x=2) and/or CH$_2$CH(C$_6$H$_5$);
n in each occurrence is the same or different and represents 0, 1, 2, 3, 4 and/or 5;
a in each occurrence is the same or different and represents an integer from 5 to 350 (preferably 10-200);
R$^9$ in each occurrence is the same or different and represents H, a branched or unbranched C$_1$-C$_4$ alkyl, CO—NH$_2$, and/or COCH$_3$;

(IIIb)

where R$^3$ is as defined above and in the case of PEG the latter has 5 to 350 and preferably 10 to 200 ethylene oxide units.

Alternatively, however, the structural unit (B) can also be represented by the general formula (IV)

—CH$_2$—CR$^1$—
          |
          Z (IV)

where
Z in each occurrence is the same or different and represents —COO(C$_m$H$_{2m}$O)$_n$—R$^{10}$, where
R$^{10}$ in each occurrence is the same or different and represents H and/or C$_1$- to C$_4$-alkyl, where
R$^1$ is as defined above, and
m=2, 3, 4 or 5, preferably 2,
n=0 to 350 preferably 10 to 200.

It has altogether proven to be advantageous if the structural unit (B) constitutes at least one representative of a monomer species selected from the series allyl polyethylene glycol monovinyl ether, methyl polyethylene glycol monovinyl ether, isoprenyl polyethylene glycol, polyethylene glycol vinyloxybutyl ether, polyethylene glycol-block-propylene glycol vinyloxybutyl ether, methyl polyethylene glycol-block-propylene glycol allyl ether, polyethylene glycol methacrylate and/or methyl polyethylene glycol-block-propylene glycol allyl ether.

The structural unit (C) may be according to the invention the polymerization product of at least one monomer species selected from representatives having the following general formulae (Va) and/or (Vb) and/or (Vc):

(Va)

where
R$^{11}$ in each occurrence is the same or different and represents H and/or a branched or unbranched C$_1$-C$_4$ group;
W in each occurrence is the same or different and represents O and/or NH;
R$^{12}$ in each occurrence is the same or different and represents a branched or unbranched C$_1$-C$_5$ monohydroxyakyl group;

(Vb)

where
R$^{11}$ is as defined above,
X in each occurrence is the same or different and represents NH—(C$_n$H$_{2n}$) where n=1, 2, 3 or 4 and/or O—(C$_n$H$_{2n}$) where n=1, 2, 3 or 4 and/or a unit not present;
R$^{13}$ in each occurrence is the same or different and represents OH, SO$_3$H, PO$_3$H$_2$, O—PO$_3$H$_2$ and/or para-substituted C$_6$H$_4$—SO$_3$H, with the proviso that when X is a unit not present, R$^{13}$ represents OH;

(Vc)

where
R$^{14}$, R$^{15}$ and R$^{16}$ are each the same or different and each independently represent H and/or a branched or unbranched C$_1$-C$_4$ alkyl group;
n in each occurrence is the same or different and represents 0, 1, 2, 3 and/or 4;
R$^{17}$ in each occurrence is the same or different and represents (C$_6$H$_5$), OH and/or —COCH$_3$.

Copolymer according to any one of claims 1 to 6, characterized in that it additionally contains a structural unit (D) which is represented by the following general formula (VI):

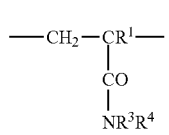
(VI)

where
$R^1$, $R^3$ and $R^4$ are each as defined above,
or represents diallylamine polyethylene glycol.

Copolymer according to any one of claims 1 to 7, characterized in that the structural unit (D) constitutes at least one representative of a monomer species selected from the series acrylamide, methacrylamide, N-methylacrylamide, N,N-dimethylacrylamide, N-ethylacrylamide, N-cyclohexylacrylamide, N-benzylacrylamide, N-methylolacrylamide and/or N-tert-butylacrylamide.

Copolymer according to any one of claims 1 to 8, characterized in that the structural unit (D is represented by the following general formula (VII):

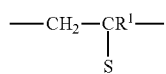
(VII)

where
S in each occurrence is the same or different and represents —COOM$_k$ where $R^1$ is as defined above and M represents a cation from the series hydrogen, alkali metal ion, alkaline earth metal ion, alkaline earth metal ion, where k=valency.

The copolymer according to any one of claims 1 to 9, characterized in that the structural unit (D) constitutes at least one representative of a monomer species selected from the series acrylic acid, sodium acrylate, methacrylic acid and/or sodium methacrylate.

The copolymer in the context of the present invention may additionally contain up to 40 mol % and preferably from 0.1 to 30 mol % of a structural unit (E) which is represented by the general formula (VIII)

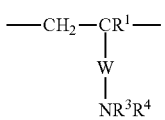
(VIII)

where W in each occurrence is the same or different and represents —CO—O—(CH$_2$)$_x$, and $R^1$, $R^3$, and $R^4$ are each as defined above and x is =an integer from 1 to 6 and preferably 2 or 3. Preferably, the additional structural unit (E) is selected from at least one representative of a monomer species selected from the series [3-(methacryloylamino)propyl]dimethylamine, [3-(acryloylamino)propyl]dimethylamine, [2-(methacryloyloxy)ethyl]dimethylamine, [2-(acryloyloxy)ethyl]dimethylamine, [2-(methacryloyloxy)ethyl]diethylamine and/or [2-(acryloyloxy)ethyl]diethylamine.

In a further version, the copolymer according to the invention in addition to the structural units (A) and (B) and also optionally (C), (D) and (E) may contain a structural unit (F) of the following general formulae (IX) and/or (X):

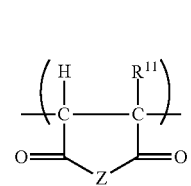
(IX)

where
$R^{11}$ is as defined above,
Z in each occurrence is the same or different and represents O and/or NH;
where

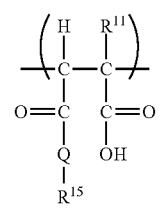
(X)

$R^{11}$ is as defined above,
Q=O or NH,
$R^{15}$ in each occurrence is the same or different and represents H, (C$_n$H$_{2n}$)—SO$_3$H where n=0, 1, 2, 3 or 4, (C$_n$H$_{2n}$)—OH where n=0, 1, 2, 3 or 4; (C$_n$H$_{2n}$)—PO$_3$H$_2$ where n=0, 1, 2, 3 or 4, (C$_n$H$_{2n}$)—OPO$_3$H$_2$ where n=0, 1, 2, 3 or 4, (C$_6$H$_4$)—SO$_3$H, (C$_6$H$_4$)—PO$_3$H$_2$, (C$_6$H$_4$)—OPO$_3$H$_2$ and/or (C$_m$H$_{2m}$)$_e$—O-(A'O)$_\alpha$—R$^{16}$ where m=0, 1, 2, 3 or 4, e=0, 1, 2, 3 or 4, A'=C$_{x'}$H$_{2x'}$ where x'=2, 3, 4 or 5 and/or CH$_2$C(C$_6$H$_5$)H—, α=an integer from 1 to 350 where R$^{16}$ in each occurrence is the same or different and represents a branched or unbranched C$_1$-C$_4$ alkyl group.

In addition to the cationic copolymer, the present invention also claims its use, preferably as an admixture agent for aqueous building product systems containing inorganic binders, especially calcium sulfate-based binders, preferably calcium sulfate hemihydrate, gypsum or anhydrite, and lime. The focus here is especially on the masking of clay constituents and/or the dispersing, and here particularly of binder fractions. The cationic copolymers are usually applied in the form of formulations together with other components. Compared with the masking agents known from the prior art, the copolymer according to the invention is by virtue of its monomer composition surprisingly useful in the production of calcium sulfate-containing suspensions.

Preferred fields of use for the copolymers are dry mortar mixtures, rendering systems and also in the production of panel-shaped elements, especially gypsumboard panels, fillers and underlayments (self-leveling underlayments, SLUs).

As mentioned, the focus with all uses in the present case is primarily on the compatibility with the known dispersing flow agents in construction chemistries and here especially in systems based on gypsum and including disruptive fractions of clay. Although the claimed copolymers are in no way restricted to selected flow agents. On the contrary, they can be combined with all known representatives. Therefore, the present invention also claims the use of the copolymers in combination with at least one other dispersant agent of the type polycarboxylate ether or polycarboxylate ester (PCE), phosphorus-containing polycondensation products (EPPR), naphthalenesu lfonateformaldehyde condensation products (BNS) and melaminesulfonate-formaldehyde condensation products (MSF).

This other component having dispersing properties preferably comprises
a) at least one component having dispersing properties selected from the series compound containing at least a branched comb polymer having polyether side chains (PCE), naphthalenesulfonate-formaldehyde condensate (BNS) and melaminesulfonate-formaldehyde condensate (MSF),
and/or
b) a polycondensation product containing
(I) at least one structural unit including an aromatic or heteroaromatic and a polyether side chain and
(II) at least one phosphated structural unit including an aromatic or heteroaromatic and
(III) at least one structural unit including an aromatic or heteroaromatic,
where structural unit (II) and structural unit (III) differ only in that the $OP(OH)_2$ group of structural unit (II) is replaced by H in structural unit (III) and structural unit (III) is other than structural unit (I).

This polycondensation product is also referred to as "EPPR" in the present context.

In connection with the gypsum-containing construction chemistries, dispersant agents are widely used auxiliaries to plasticize the mixture of water and calcium sulfate hemihydrate and to keep the aqueous slurry thus obtained flowable with reduced total mixing water requirements. Sulfonated β-naphthalene-formaldehyde resins (BNS) and sulfonated melamine-formaldehyde condensation products (MFS) are very well known as flow agents, but their mode of action is limited. The production and use of BNS is known for example from the patent documents EP 0 214 412 A1 and DE-C-2 007 603, the disclosure content of each of which is a substantive constituent part of the present disclosure. The efficacy and properties of BNS can be modified by modifying the molar ratio between formaldehyde and the naphthalene component, this ratio normally being between 0.7 and 3.5. The ratio between formaldehyde and the sulfonated naphthalene component is preferably in the range from 0.8 to 3.5:1.0. BNS condensation products are typically added to binder-containing compositions in proportions of 0.01% to 6.0% by weight.

Sulfonated melamine-formaldehyde condensation products are likewise widely used for flow enhancement of binder-containing compositions such as, for example, dry mortar mixtures or other cement-bound construction chemistries, but also in connection with the production of gypsumboard panels. Melamine in this connection is a prominent representative of s-triazines. They effectuate substantial plasticization of construction chemistries without causing undesired side-effects during processing or with respect to the functional properties of cured building products. There is a lot of prior art for MSF resins as well as for BNS technology. Details appear for example in DE 196 09 614 A1, DE 44 11 797 A1, EP 0 059 353 A1 and DE 195 38 82 A1, which are likewise in the totality of their disclosures a substantive constituent part of the present description.

DE 196 09 614 A1 describes a water-soluble polycondensation product based on an amino-s-triazine, and is used as plasticizer for aqueous binder-containing suspensions based on cement, lime or gypsum. These polycondensation products are obtainable in two condensation steps, while the amino-s-triazine, the formaldehyde component and the sulfite are condensed in a precondensation at a molar ratio of from 1 to 0.5:5.0 to 0.1:1.5. The amino-s-triazine used is preferably melamine. Further suitable representatives are aminoplast formers from the group urea, thiourea, dicyandiamide or guanidines and guanidine salts.

According to DE 44 11 797 A1, sulfanilic acid-containing condensation products based on aminos-=triazines having at least two amino groups are prepared using formaldehyde. The sulfanilic acid is used in proportions of 1.0 to 1.6 mol per mol of amino-s-triazine and neutralized with an alkali or alkaline earth metal hydroxide in aqueous solution. In a further process step, the formaldehyde is added in amounts of 3.0 to 4.0 mmol per mol of amino-s-triazine at a pH between 5.0 and 7.0 and also at temperatures between 50 and 90° Celsius. The final viscosity of the solution is between 10 and 60 cSt at 80° C.

According to EP 0 059 353 A1, highly concentrated and low-viscosity aqueous solutions of melamine/aldehyde resins are obtainable by reaction of melamine and an aldehyde in an alkaline medium in a process wherein in a first step an alkali metal sulfate, an alkaline earth metal sulfate or an alkali or alkaline earth metal sulfonate or some other suitable amino component are reacted to form a precondensation product. In a subsequent reaction step, this mixture is reacted with another amine, for example an amino acid or an amino carboxylic acid, and finally the resin solution obtained is adjusted to an alkaline pH.

DE 195 38 821 A1 describes a condensation product which is based on an amino-s-triazine having at least two amino groups and formaldehyde and additionally has a high sulfonic acid group content and a low formate content. Products of this type are obtainable by reacting the amino-s-triazine, formaldehyde and a sulfide at a specific molar ratio in aqueous solution and at temperatures between 60 and 90° C. and also at a pH between 9.0 and 13.0 until the sulfide is no longer detectable. In a subsequent reaction step, at a pH between 3.0 and 6.5 and also at temperatures between 60 and 80° C., reaction is continued until the condensation product has a viscosity between 5 and 50 mm$^2$/s at 80° C. Finally, the condensation product is adjusted to a pH between 7.5 and 12.0 or thermally aftertreated at a pH≥10.0 and temperatures between 60 and 100° C.

The component a) is preferably selected from the series polycarboxylate ether $a_1$), polycarboxylate ether $a_2$), uncharged copolymer $a_3$) or mixtures thereof.

Preference is given to a version $a_1$) where a copolymer consisting of
1) at least one olefinically unsaturated monocarboxylic acid comonomer or an ester or a salt thereof and/or an olefinically unsaturated sulfonic acid comonomer or a salt thereof,
and
2) at least one comonomer of the general formula (XI)

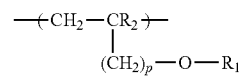

where $R_1$ represents

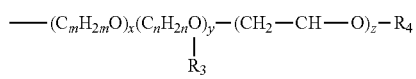

and $R_2$ represents H or an aliphatic hydrocarbonaceous moiety having 1 to 5 carbon atoms; $R_3$=substituted or unsubstituted aryl radical and preferably phenyl, and $R_4$=H or an aliphatic hydrocarbonaceous moiety having 1 to 20 carbon atoms, a cycloaliphatic hydrocarbonaceous moiety having 5 to 8 carbon atoms, a substituted aryl radical having 6 to 14 carbon atoms or a representative of the series

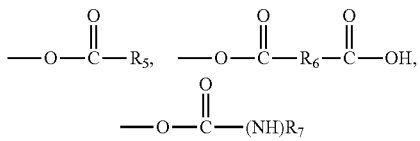

where $R_5$ and $R_7$ each represent an alkyl, aryl, aralkyl or alkaryl radical and $R_6$ represents an alkylidene, arylidene, aralkylidene or alkarylidene radical, and
p=0, 1, 2, 3 or 4
m and n are each independently 2, 3, 4 or 5,
x and y are each independently an integer ≤350, and
z=0 to 200,
wherein (I) the comonomer units in copolymer $a_1$) which constitute the components 1) and 2) each have no intramolecular differences, and/or (II) the copolymer $a_1$) constitutes a polymeric mixture of components 1) and 2), although in this case the comonomer units have intramolecular differences with regard to $R_1$ and/or $R_2$ and/or $R_3$ and/or $R_4$ and/or $R_5$ and/or $R_6$ and/or $R_7$ and/or m and/or m and/or x and/or y and/or z and wherein the differences mentioned relate more particularly to side chain composition and length.

The copolymer $a_1$) may contain the comonomer component 1) in proportions of 30 to 99 mol % and the comonomer component 2) in proportions of 70 to 1 mol % and more preferably in proportions of 40 to 90 mol %, in which case the comonomer component 2) is then present in proportions of 60 to 10 mol %.

The comonomer component 1) preferably represents acrylic acid or a salt thereof, and the comonomer component 2) where p=0 or 1 contains a vinyl or allyl group and a polyether $R_1$. It is very advantageous when the comonomer component 1) comes from the series acrylic acid, methacrylic acid, crotonic acid, isocrotonic acid, allylsulfonic acid, vinylsulfonic acid and their suitable salts and also their alkyl or hydroxyalkyl esters.

It is likewise provided that the copolymer $a_1$) includes additional building groups in copolymerized form, these additional building groups being styrenes, acrylamides and/or hydrophobic compounds, with ester structural units, polypropylene oxide and polypropylene oxide-polyethylene oxide units being particularly preferable.

The copolymer $a_1$) should contain the additional building group in proportions up to 5 mol %, preferably in the range from 0.05 to 3.0 mol % and especially in the range from 0.1 to 1.0 mol %.

With regard to copolymer $a_1$), formula (I) represents an allyl- or vinyl-containing polyether.

Polycarboxylate ester $a_2$) is preferably a polymer obtainable by polymerizing a monomer mixture (I) containing a representative of the monomer type carboxylic acid as main component.

According to the invention, the monomer mixture (I) may contain an (alkoxy)polyalkylene glycol mono(meth)acrylic ester monomer (a) of the general formula (XII)

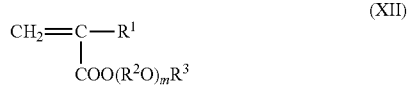

where $R^1$ represents a hydrogen atom or a $CH_3$ group, $R^2O$ represents one representative or a mixture of at least two oxyalkylene groups having 2 to 4 carbon atoms, $R^3$ represents a hydrogen atom or an alkyl group having 1 to 5 carbon atoms and m is a number between 1 and 250 and represents the average number of moles of the oxyalkylene group added, additionally as monomer (b) a (meth)acrylic acid of the general formula (XIII),

where $R^4$ represents a hydrogen atom or a $CH_3$ group and $M^1$ represents a hydrogen atom, a monovalent metal atom, a divalent metal atom, an ammonium group or an organic amine group, and optionally a monomer (c) which is copolymerizable with the monomers (a) and (b). The monomer (a) may be present in the monomer mixture (1) in an amount of 5% to 98% by weight, the monomer (b) may be present in the monomer mixture (I) in an amount of 2% to 95% by weight and the monomer (c) may be present in the monomer mixture (I) in an amount up to 50% by weight, the respective amounts of monomers (a), (b) and (c) adding up to 100% by weight.

Monomer (a) is a hydroxyethyl(meth)acrylate, hydroxypropyl(meth)acrylate, polyethylene glycol mono(meth)acrylate, polypropylene glycol mono(meth)acrylate, polybutylene glycol mono(meth)acrylate, polyethylene glycol polypropylene glycol mono(meth)acrylate, polyethylene glycol polybutylene glycol mono(meth)acrylate, polypropylene glycol polybutylene glycol mono(meth)acrylate, polyethylene glycol polypropylene glycol polybutylene glycol mono(meth)acrylate, methoxy polyethylene glycol mono(meth)acrylate, methoxy polypropylene glycol mono(meth)acrylate, methoxy polybutylene glycol mono(meth)acrylate, methoxy polyethylene glycol polypropylene glycol mono(meth)acrylate, methoxy polyethylene glycol polybutylene glycol mono(meth)acrylate, methoxy polypropylene glycol polybutylene glycol mono(meth)acrylate, methoxy polyethylene glycol polypropylene glycol polybutylene glycol mono(meth)acrylate, ethoxy polyethylene glycol mono(meth)acrylate, ethoxy polypropylene glycol mono(meth)acrylate, ethoxy polybutylene glycol mono(meth)acrylate, ethoxy polyethylene glycol polypropylene glycol mono(meth)acrylate, ethoxy polyethylene glycol polybutylene glycol mono(meth)acrylate, ethoxy polypropylene glycol polybutylene glycol mono(meth)acrylate, ethoxy polyethylene glycol polypropylene glycol polybutylene glycol mono(meth)acrylate or mixtures thereof.

Acrylic acid, methacrylic acid, monovalent metal salts, divalent metal salts, ammonium salts and organic amine salts thereof and mixtures are typical representatives of monomer (b).

Monomer (c) may be at least one representative of the esters of an aliphatic alcohol having 1 to 20 carbon atoms with an unsaturated carboxylic acid, in which case they are suitable as unsaturated carboxylic acid, maleic acid, fumaric acid, citraconic acid (meth)acrylic acid or monovalent metal salts, divalent metal salts, ammonium salts or organic amine salts. Monoesters or diesters of unsaturated dicarboxylic acids, such as maleic acid, fumaric acid or citraconic acid, with aliphatic $C_1$-$C_{20}$ alcohols, $C_2$-$C_4$ glycols or with (alkoxy)polyalkylene glycols are particularly suitable.

According to the present invention, component $a_2$) is preferably a copolymer based on at least one of the following monomers:

A) an ethylenically unsaturated monomer comprising a hydrolysable moiety, this hydrolysable monomer having an active bonding site for at least one component of the final composition including the formulation;

B) an ethylenically unsaturated monomer having at least one $C_2$-$C_4$-oxyalkylene side group having a chain length of 1 to 30 units;

C) an ethylenically unsaturated monomer having at least one $C_2$-$C_4$-oxyalkylene side group having a chain length of 31 to 350 units.

The ethylenically unsaturated monomer of component A) comprises at least one anhydride or imide and/or at least one maleic anhydride or maleimide.

It is further provided that the ethylenically unsaturated monomer of component A) comprises an acrylic ester having an ester functionality which contains the hydrolysable moiety.

The ester functionality should be at least a hydroxypropyl or hydroxyethyl moiety.

The copolymer $a_2$) in the component A) should preferably include more than one ethylenically unsaturated monomer having a hydrolysable moiety, and the ethylenically unsaturated monomer of component A) should include as remainder at least more than one representative of ethylenically unsaturated monomers, at least one representative of a hydrolysable moiety or a mixture thereof.

In a further preferable version, the hydrolysable moiety may include at least one $C_2$-$C_{20}$ alcohol functionality, in which case the hydrolysable moiety is then at least a $C_1$-$C_{20}$ alkyl ester, a $C_1$-$C_{20}$-aminoalkyl ester or an amide.

At least one ethylenically unsaturated monomer of component B) or C) includes a $C_2$-$C_8$-alkelyl ether group, in which case the ethylenically unsaturated monomer includes a vinyl, allyl or (meth)allyl ether moiety or is derived from an unsaturated $C_2$-$C_8$-alcohol which is at least one representative from the series vinyl alcohol, (meth)allyl alcohol, isoprenol or methylbutenol.

In copolymer $a_2$), the ethylenically unsaturated monomer side groups of component B) or C) include at least one $C_4$-oxyalkylene unit, in which case at least one ethylenically unsaturated component of B) or C) should also include a $C_2$-$C_8$-carboxylic ester that is hydrolysable in particular. The oxyalkylene side group preferably includes at least one ethylene oxide, one propylene oxide, one polyethylene oxide, one polypropylene oxide or mixtures thereof.

It is likewise provided that the copolymer $a_2$) in the component C) includes at least one nonionionic and/or a nonhydrolysable monomer moiety or mixtures thereof.

With regard to the nonionic copolymer $a_3$), the invention provides that it concerns a representative of the general formula (XIV)

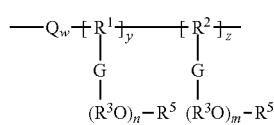

(XIV)

where Q represents an ethylenically unsaturated monomer having at least one hydrolysable moiety, G represents O, C(O)—O or O—$(CH_2)_p$—O where p=2 to 8, although mixtures of versions of G in one polymer are possible; $R^1$ and $R^2$ independently represent at least one $C_2$-$C_8$-alkyl; $R^3$ comprises $(CH_2)_c$, where c is an integer between 2 and 5 and where mixtures of representatives of $R^3$ in the same polymer molecule are possible; $R^5$ represents at least one representative selected from the series H, a linear or branched saturated or unsaturated $C_1$-$C_{20}$ aliphatic hydrocarbonaceous moiety, a $C_5$-$C_8$ cycloaliphatic hydrocarbonaceous moiety or a substituted or unsubstituted $C_1$-$C_{14}$ aryl moiety; m=1 to 30, n=31 to 350, w=1 to 40, y=0 to 1 and z=0 to 1 provided the sum (y+z) is >0.

The nonionic copolymer $a_3$) may alternatively, however, also be a representative of the general formula (XV)

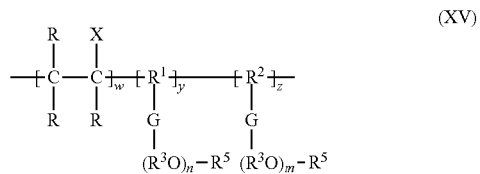

(XV)

where X represents a hydrolysable moiety and R represents H or $CH_3$; G, p, $R^1$, $R^2$, $R^3$, $R^5$, m, n, w, y, z and (y+z) are each as defined under formula (IV).

This hydrolysable moiety is at least one representative from the series alkyl ester, aminoalkyl ester, hydroxyalkl ester, aminohydroxyalkyl ester or amide.

It was further found to be advantageous when the nonionic copolymer $a_3$) is at least one representative of the general formula (XVI)

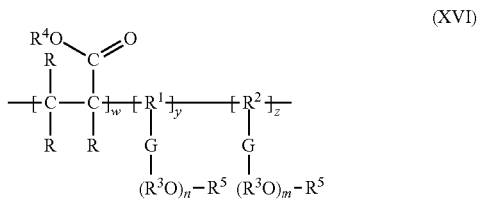

(XVI)

where $R^4$ represents at least one $C_1$-$C_{20}$ alkyl or $C_2$-$C_{20}$ hydroxyalkyl radical and the radicals G, p, R, $R^1$, $R^2$, $R^3$, c, $R^4$, $R^5$ and also m, n, w, y, z and (y+z) are each as defined under formulae (IV) and (V). In this case, p should be=4, $R^4$ should be=$C_2H_4OH$ or $C_3H_6OH$, each of $R^5$ should represent H, m should be=5-30, n should be=31-250, w should be=1.5-30, y should be=0 to 1, z should be=0 to 1 and (y+z) should be >0.

The molar ratio in copolymer $a_3$) should be in the range from 1:1 to 20:1 and preferably in the range from 2:1 to 12:1 for the ratio of w to the sum total (y+z).

The copolymer $a_3$), however, may alternatively also be a nonionic polyether-polyester copolymer.

The structural units (I), (II), (III) of component b) are preferably represented by the following formulae:

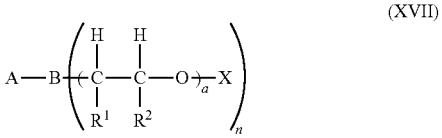

(XVII)

where

A in each occurrence is the same or different and represents a substituted or unsubstituted aromatic or heteroaromatic compound having 5 to 10 carbon atoms where B in each occurrence is the same or different and represents N, NH or O where n=2, when B=N, and n=1 when B=NH or O where $R^1$ and $R^2$ are each independently the same or different and represent a branched or unbranched $C_1$- to $C_{10}$-alkyl radical, $C_5$- to $C_8$-cycloalkyl radical, aryl radical, heteroaryl radical or H where a in each occurrence is the same or different and represents an integer from 1 to 300 where X in each occurrence is the same or different and represents a branched or unbranched $C_1$- to $C_{10}$-alkyl radical, $C_5$- to $C_8$-cycloalkyl radical, aryl radical, heteroaryl radical or H

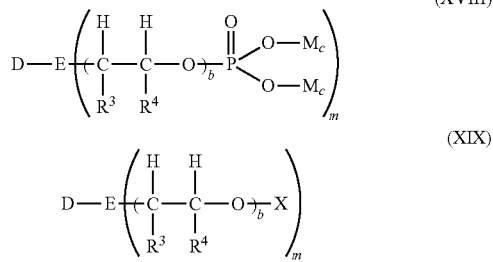

for (XVIII) and (XIX) in each case:

where

D in each occurrence is the same or different and represents a substituted or unsubstituted heteroaromatic compound having 5 to 10 carbon atoms where E in each occurrence is the same or different and represents N, NH or O where m=2 when E=N, and m=1 when E=NH or O where $R^3$ and $R^4$ are each independently of the other the same or different and represent a branched or unbranched $C_1$- to $C_{10}$-alkyl radical, $C_5$- to $C_8$-cycloalkyl radical, aryl radical, heteroaryl radical or H where b in each occurrence is the same or different and represents an integer from 0 to 300 where

M in each occurrence independently represents an alkali metal, alkaline earth metal, ammonium or organic ammonium acid ion and/or H, where c=1 or in the case of an alkali metal ion=½.

The component b) here may contain a further structural unit (XX) which is represented by the following formula:

where

Y in each occurrence independently is the same or different and represents (XVII), (XVIII), (XIX) or further constituents of the polycondensation product b) where $R^5$ in each occurrence is the same or different and represents H, $CH_3$, $COOM_c$ or a substituted or unsubstituted aromatic or heteroaromatic compound having 5 to 10 carbon atoms where $R^6$ in each occurrence is the same or different and represents H, $CH_3$, $COOM_c$ or a substituted or unsubstituted aromatic or heteroaromatic compound having 5 to 10 carbon atoms, where $M_c$ has the meanings mentioned in respect of formula (XVIII).

$R^5$ and $R^6$ radicals in structural unit (XX) of component b) may be the same or different independently of each other and represent H, $COOM_c$ and/or methyl. The molar ratio of structural units [(XVII)+(XVIII)+(XIX)]:(XX) in component b) should be 1:0.8 to 3.

It is particularly preferable for the molar ratio of structural units (XVII):[(XVIII)+(XIX)] in component b) to be in the range from 1:15 to 15:1 and preferably in the range from 1:10 to 10:1.

The molar ratio of structural units (XVIII):(XIX) in component b) is preferably in the range from 1:0.005 to 1:10.

According to the invention, the polycondensation product b) is in the form of an aqueous solution containing 2% to 90% by weight of water and 98% to 10% by weight of dissolved dry matter.

For improved workability of construction chemistries, preferably those based on $CaSO_4$, the dispersing components a) and b) should be used together with the copolymer according to the invention in the formulated state, wherein component a) should then be included in proportions of 5% to 95% by weight, preferably of 10% to 60% by weight and more preferably of 15% to 40% by weight, all based on the overall formulation. Component b) should be present in proportions of 5% to 100% by weight, preferably of 10% to 60% by weight and more preferably of 15% to 40% by weight, all based on the overall formulation.

In addition to the components a) and b), the system may contain at least one defoamer as component c) and/or a component d) with surface activity, in which case the components c) and d) are structurally different from each other.

The defoamer component c) should be at least one representative of the series mineral oil, vegetable oil, silicone oil, silicone-containing emulsions, fatty acid, fatty acid esters, organomodified polysiloxane, borate ester, alkoxylate, polyoxyalkylene copolymer, ethylene oxide (EO)propylene oxide (PO) block polymer, acetylenic diol having defoaming properties, phosphoric esters of the formula $P(O)(O-R_8)_{3-x}(O-R_9)_x$, where P=phosphorus, O=oxygen and $R_8$ and $R_9$ each independently represent a $C_{2-20}$ alkyl or an aryl group and x=0, 1 or 2.

The defoamer component c), however, can also be at least one representative of the series trialkyl phosphate, polyoxypropylene copolymer and/or glyceryl alcohol acetate, or triisobutyl phosphate.

Preferably, the defoamer component c) is a mixture of a trialkyl phosphate and a polyoxypropylene copolymer.

The component d) with surface activity can be at least one representative of the series ethylene oxide/propylene oxide (EO/PO) block copolymer, styrene-maleic acid copolymer, fatty acid alcohol alkoxylate, alcohol ethoxylate $R_{10}$-(EO)—H where $R_{10}$=an aliphatic hydrocarbonaceous group having 1 to 25 carbon atoms, acetylenic diol, monoalkylpolyalkylene, ethoxylated nonylphenol, alkyl sulfate, alkyl ether sulfate, alkyl ether sulfonate or alkyl ether carboxylate, in which case alcohols having a polyalkylene group having a carbon chain length of 2 to 20 carbon atoms can be present. The polyalkylene group should more particularly have a carbon chain length of 3 to 12 carbon atoms.

The dispersing component may contain the defoamer component c) in free form, bound to the dispersant agent component a) or as a mixture of these two forms.

The defoamer component c) and/or the surface-active component d) are each preferably present in amounts of 0.01% to 10% by weight, both based on the total weight of the formulation.

The defoamer c) and/or the surface-active component d) are each present independently of each other in an amount of 0.01% to 5% by weight, both based on the total weight of the dispersant agent.

The dispersant agent component or else the construction-chemical system may contain as a further additional component f) a calcium silicate hydrate (C—S—H) composition wherein the molar ratio of calcium/silicon (Ca/Si) is in the range from 0.5 to 2.0, preferably in the range from 0.7 to 1.8 and more preferably in the range from 1.6 to 1.7.

The C—S—H preferably has an average particle size <10 μm, preferably <1 μm and especially <0.2 μm, determined by light scattering using the Master Sizer 2000 from Malvern. The average particle size is preferably >0.01 μm, more preferably between 0.1 and 1.0 μm and especially between 0.2 μm and 0.5 μm.

The C—S—H composition is advantageously obtainable by reacting a water-soluble calcium-containing compound with a water-soluble silicate-containing compound, with the reaction being carried out between the water-soluble calcium-containing compound and the water-soluble silicate-containing compound preferably in the presence of an aqueous solution containing a water-soluble comb polymer which preferably comprises a dispersant agent typified by at least one representative of component a) and/or b) for hydraulic binders. However, the C—S—H composition is alternatively also obtainable by reacting a calcium oxide, a calcium carbonate and/or a calcium hydroxide with a silicon dioxide during a grinding operation, in which case the reaction is preferably carried out in the presence of an aqueous solution containing a water-soluble comb polymer which preferably comprises a dispersant agent typified by at least one representative of component a) and/or b) for hydraulic binders.

Advantageously, the copolymer of the present invention is used in combination with a dispersant agent component which is in liquid form or in the form of a powder, preferably in the form of a redispersible powder.

The copolymers which according to the present invention are used as adsorption blockers in the calcium sulfate-containing building product mixture are capable of modifying aggregates and especially clay-based aggregates or fractions in inorganic, especially in $CaSO_4$-based building product masses, such that their use renders the surfaces of the clay-type fractions distinctly less attractive to polycarboxylate ether-based flow agents (i.e., copolymers including polyether macromonomer structural units and acid monomer structural units). As a result, the mode of action of polycarboxylate ether-based flow agents is not impaired and therefore the consistency of the building product formulation and especially of the gypsum slurry can be maintained over time.

The copolymer which according to the present invention is usable as an adsorption blocker is a cationically charged molecule (normally an oligomer or a polymer) which has a particularly large affinity for adsorptive fractions, but only a minimal attraction if any to the surfaces of the particles of inorganic binder. The specific charge in the adsorption blocker can be used to control the degree of attraction of the molecule to the adsorptive fractions of clay and also the degree of repulsion against the polycarboxylate ether-based flow agents.

Depending on the particular specific use scenario, the adsorption blocker which acts as masking agent can be added to the construction-chemical gypsum mixture before the flow agent component in order that said adsorption blocker may interact with the adsorptive constituents and modify their surfaces such that they are no longer attractive to flow agents based on polycarboxylate ethers in particular.

The present invention envisions altogether that the copolymers of the present invention, or selected versions thereof, are added to the construction-chemical gypsum mixture as a formulated mixture with a dispersant agent. In addition to the components mentioned, the formulations may also contain at least one curing retarder which lengthens the stiffening times and/or the working time of the construction-chemical system, especially of the gypsum slurry. The retarder component should comprise conventional setting retarders for calcium sulfate-based building product systems, for example from the series of chelating agents, i.e., complexing agents such as ethylenediaminetetraacetate, diethylenetriaminepentacetate (e.g., the Trilon range available from BASF SE), phosphates, phosphonates (e.g., the Targon range available from BK Giulini GmbH) or sugar, tartaric acid, succinic acid, citric acid, gluconates, maleic acids, polyacrylic acids and salts thereof and also Retardan (available from Tricosal GmbH). The proportions of the formulation which are attributable to retarder component should not exceed 10% by weight, based on the formulation's solids content. Proportions between 2.0% and 8.0% by weight and preferably 4.0% to 6.5% by weight are advisable.

Mixtures of this type are altogether very stable in storage, especially to phase separation, gelling, etc.

The examples which follow demonstrate the advantages of the present invention.

EXAMPLES

Synthesis Example 1

Cationic Comb Polymer 1

A four-neck flask equipped with a stirrer, a pH electrode and a reflux condenser was charged with 240 g of water and 200 g of vinyloxybutyl polyethylene glycol 3000 (prepared by ethoxylation of hydroxybutyl vinyl ether with 66 mol of EO) and conditioned to 10° C. Thereafter, 0.01 g of iron(II) sulfate heptahydrate, 72.4 g of ADAME-Q (80%), 2.5 g of sodium salt of an organic sulfinic acid derivative (Brüggolit E01, from Brüggemann GmbH) and also 2.4 g of acrylic acid (99%) and 0.9 g of 3-mercaptopropionic acid were added in to the flask, and a pH of 4.5 became established in the solution. After a short mixing time of about 2 minutes, 2.5 g of 50% hydrogen peroxide solution were added to the solution. The ensuing polymerization was marked by a continuous increase in temperature, culminating after about 2 minutes in a maximum temperature of about 35° C. At this stage, the pH of the solution was 2.9.

Finally, a pH of 6.5 was set with 20% sodium hydroxide solution.

This gave the aqueous solution of a copolymer having an average molecular weight of Mw=51.489 g/mol (determined by GPC) and a solids content of 49.7%. The yield of polymer, compared with unsaturated alcohol ethoxylate not incorporated therein, was 82%.

Synthesis Example 2

Cationic Comb Polymer 2

A four-neck flask equipped with a stirrer, a pH electrode and a reflux condenser was charged with 400 g of water and 350 g of vinyloxybutyl polyethylene glycol 5800 (prepared by ethoxylation of hydroxybutyl vinyl ether with 130 mol of EO) and conditioned to 13° C. Thereafter, 0.01 g of iron(II) sulfate heptahydrate, 65.5 g of ADAME-Q (80%), 2.5 g of sodium salt of an organic sulfinic acid derivative (Brüggolit E01, from Brüggemann GmbH) and also 2.2 g of acrylic acid (99%) and 1.2 g of 3-mercaptroropionic acid were added to the flask, and a pH of 4.8 became established in the solution. After a short mixing time of about 2 minutes, 2.5 g of 50% hydrogen peroxide solution were added to the solution. The ensuing polymerization was marked by a continuous increase in temperature, culminating after about 2 minutes in a maximum temperature of about 25° C. At this stage, the pH of the solution was 3.7.

Finally, a pH of 6.5 was set with 20% sodium hydroxide solution.

This gave the aqueous solution of a copolymer having an average molecular weight of Mw=61.342 g/mol (determined by GPC) and a solids content of 49.2%. The yield of polymer, compared with unsaturated alcohol ethoxylate not incorporated therein, was 84.7%.

Synthesis Example 3

Cationic Comb Polymer 3

A four-neck flask equipped with a stirrer, a pH electrode and a reflux condenser was charged with 5000 g of water and 350 g of vinyloxybutyl polyethylene glycol 5800 (prepared by ethoxylation of hydroxybutyl vinyl ether with 130 mol of EO) and conditioned to 13° C. Thereafter, 0.01 g of iron(II) sulfate heptahydrate, 35.7 g of hydroxyethyl acrylate (98%), 8.7 g of ADAME-Q (80%), 5 g of a mixture of sodium sulfite, the disodium salt of 2-hydroxy-2-sulfinatoacetic acid and the disodium salt of 2-hydroxy-2-sulfonatoacetic acid, (Brüggolit FF6, from Brüggemann GmbH), and also 0.5 g of acrylic acid (99%) and 1.4 g of 3-mercaptopropionic acid were added to the flask, and a pH of 5.9 became established in the solution. After a short mixing time of about 2 minutes, 2.5 g of 50% hydrogen peroxide solution were added to the solution. The ensuing polymerization was marked by a continuous increase in temperature, culminating after about 2 minutes in a maximum temperature of about 25° C. At this stage, the pH of the solution was 5.7.

Finally, a pH of 6.5 was set with 20% sodium hydroxide solution.

This gave the aqueous solution of a copolymer having an average molecular weight of Mw=86.799 g/mol (determined by GPC) and a solids content of 44.0%. The yield of polymer, compared with unsaturated alcohol ethoxylate not incorporated therein, was 80.9%.

Synthesis Example 4

Cationic Comb Polymer 4

A four-neck flask equipped with a stirrer, a pH electrode and a reflux condenser was charged with 500 g of water and 350 g of vinyloxybutyl polyethylene glycol 5800 (prepared by ethoxylation of hydroxybutyl vinyl ether with 130 mol of EO) and conditioned to 13° C. Thereafter, 0.01 g of iron(II) sulfate heptahydrate, 16 g of hydroxypropyl acrylate (98%), 29 g of ADAME-Q (80%), 3.5 g of sodium salt of an organic sulfinic acid derivative (Brüggolit E01, from Brüggemann GmbH), and also 0.5 g of acrylic acid (99%) and 0.9 g of 3-mercaptopropionic acid were added to the flask, and a pH of 5.6 became established in the solution. After a short mixing time of about 2 minutes, 2.5 g of 50% hydrogen peroxide solution were added to the solution. The ensuing polymerization was marked by a continuous increase in temperature, culminating after about 2 minutes in a maximum temperature of about 25° C. At this stage, the pH of the solution was 4.9.

Finally, a pH of 6.5 was set with 20% sodium hydroxide solution.

This gave the aqueous solution of a copolymer having an average molecular weight of Mw=103.654 g/mol (determined by GPC) and a solids content of 44.3%. The yield of polymer, compared with unsaturated alcohol ethoxylate not incorporated therein, was 82%.

Use Example

Flow Tests with Calcium Sulfate Hemihydrate (Beta)

The required amounts of liquid flow agent and of inventive copolymer (as per synthesis examples 1 to 4) were weighed into the pot of a Hobart® mixer and the water quantity corresponding to the water-gypsum value in tables 1 to 4 is added. Then, 400 g of gypsum are added together with the accelerator and the stated amounts of montmorillonite clay, steeped for 15 seconds and then mixed for 15 seconds at 285 rpm (level II). After 60 seconds the slump is determined with a cylinder (height: 10 cm, diameter: 5 cm). Stiffening time is determined using the blade cut test.

The following flow agents were used in the performance tests: polycarboxylate ether flow agent Melflux PCE 239 L/35% N.D. (PCE 239) and VP2661/493 L/40% ND. (PCE 493); naphthalenesulfonate condensation product Melcret 500 L (BNS) and also melamine-sulfonic acid-formaldehyde condensation product Melment L 15 G (MFS). All the flow agents were provided by BASF Construction Polymers GmbH, Germany. In addition, the phosphated condensation product VP EPPR 312 L/43% (EPPR) (likewise from BASF Construction Polymers GmbH) and the lignin-based flow agent Borrement CA 120 (Lignin) from Borregaard LignoTech were used.

Table 1 summarizes the mineralogical compositions of the gypsums used. The swellable montmorillonite clay used for doping the pure gypsum A was obtained from Ward's Natural Science.

TABLE 1

Composition of natural calcium sulfate hemihydrates A, B, C and D

| natural gypsum | CaSO$_4$* ½ H$_2$O | CaSO$_4$ | dolomite | quartz | clay minerals | others |
|---|---|---|---|---|---|---|
| A | 95.3% | 4.0% | — | — | — | 0.7% |
| B | 80.2% | — | 8.9% | 1.4% | 4.2% | 5.3% |
| C | 90.0% | — | 4.7% | 1.1% | 1.3% | 2.9% |
| D | 87.2% | 3.1% | 1.2% | 1.9% | 2.9% | 3.7% |

TABLE 2

Change in flow behavior due to addition of inventive copolymers 1 to 3 (natural gypsum A doped with 2% by weight of montmorillonite)

| Copolymer corresponding to Example | Dosage [wt %] | Flow agent | Dosage [wt %] | Water-gypsum value | Accelerator [g])* | Slump [cm] | Stiffening time [min:s] |
|---|---|---|---|---|---|---|---|
| — | — | PCE 239 | 0.20 | 0.55 | 0.00 | 10.1 | 2:15 |
| 1 | 0.10 | PCE 239 | 0.20 | 0.55 | 0.50 | 21.5 | 2:15 |
| 2 | 0.10 | PCE 239 | 0.20 | 0.55 | 0.50 | 20.6 | 2:20 |
| 3 | 0.10 | PCE 239 | 0.20 | 0.55 | 0.50 | 18.5 | 2:20 |
| 3 | 0.12 | PCE 239 | 0.24 | 0.55 | 0.650 | 21.2 | 2:05 |
| 3 | 0.12 | PCE 493 | 0.24 | 0.55 | 0.650 | 20.7 | 2:20 |

)* finely ground CaSO$_4$ dihydrate

As is clearly apparent in table 2, the inventive copolymers (=comb polymers) 1 to 3 improve the dispersing properties of the PCE 239 and 493 plasticizers in clay-doped gypsum (natural gypsum A doped with 2% of montmorillonite). The negative effect of clay on the flowability of the gypsum mass is very largely eliminated by inventive copolymers 1 to 3.

TABLE 3

Change in slump due to addition of different amounts of montmorillonite clay or of copolymer 1 as per synthesis example 1 to natural gypsum A (a constant dosage of 0.10% of PCE 239 was used for all tests).

| Copolymer dosage [wt %] | Clay fraction [% by weight based on gypsum] | Water-gypsum value | Accelerator [g])* | Slump [cm] | Stiffening time [min:s] |
|---|---|---|---|---|---|
| 0.0 | 0.5 | 0.57 | 0.400 | 13.0 | 2:10 |
| 0.02 | 0.5 | 0.57 | 0.400 | 18.8 | 2:15 |
| 0.05 | 0.5 | 0.57 | 0.400 | 20.4 | 2:10 |
| 0.10 | 0.5 | 0.57 | 0.400 | 21.1 | 2:15 |
| 0.0 | 1.0 | 0.57 | 0.415 | 10.5 | 2:10 |
| 0.02 | 1.0 | 0.57 | 0.415 | 16.5 | 2:10 |
| 0.05 | 1.0 | 0.57 | 0.415 | 20.1 | 2:15 |
| 0.10 | 1.0 | 0.57 | 0.415 | 20.3 | 2:15 |
| 0.02 | 2.0 | 0.57 | — | n.f. | — |
| 0.05 | 2.0 | 0.57 | 0.410 | 13.0 | 2:00 |
| 0.10 | 2.0 | 0.57 | 0.410 | 17.2 | 2:10 |
| 0.30 | 2.0 | 0.57 | 0.430 | 19.2 | 2:20 |
| 0 | 0.5 | 0.54 | 0.400 | 11.8 | 2:15 |
| 0.02 | 0.5 | 0.54 | 0.400 | 17.3 | 2:10 |
| 0.10 | 0.5 | 0.54 | 0.400 | 18.0 | 2:15 |
| 0.20 | 0.5 | 0.54 | 0.400 | 18.6 | 2:20 |
| 0.0 | 2.0 | 0.605 | — | n.f. | — |
| 0.02 | 2.0 | 0.605 | 0.440 | 17.5 | 2:05 |
| 0.10 | 2.0 | 0.605 | 0.440 | 20.8 | 2:15 |
| 0.20 | 2.0 | 0.605 | 0.440 | 22.7 | 2:20 |

)*finely ground CaSO$_4$ dihydrate
n.f. = not flowable

It is evident from table 3 that adding the inventive copolymer improves the slump significantly without retarding the setting behavior (=stiffening) of gypsum. Even at high dosages of 2% for swellable montmorillonite clay, a flowable gypsum mass is obtainable by adding the cationic comb polymer 1.

TABLE 4

Change in slump behavior due to different amounts of cationic comb polymer 4 combined with the flow agents PCE 493, EPPR and BNS (natural clay-containing gypsum B).

| Copolymer 4 Dosage [wt %] | Flow agent | Dosage [wt %] | Water-gypsum value | Accelerator [g] )* | Slump [cm] | Stiffening time [min:s] |
|---|---|---|---|---|---|---|
| 0.00 | PCE 493 | 0.20 | 0.77 | 0.26 | 20.4 | 2:20 |
| 0.10 | PCE 493 | 0.10 | 0.65 | 0.30 | 20.3 | 2:20 |
| 0.10 | PCE 493 | 0.00 | 0.77 | 0.26 | 20.6 | 2:20 |
| 0.00 | EPPR | 0.20 | 0.67 | 0.16 | 20.3 | 2:15 |
| 0.10 | EPPR | 0.10 | 0.62 | 0.14 | 20.0 | 2:10 |
| 0.20 | EPPR | 0.10 | 0.57 | 0.15 | 20.0 | 2:15 |
| 0.20 | EPPR | 0.20 | 0.52 | 0.16 | 20.8 | 2:20 |
| 0.00 | BNS | 0.20 | 0.71 | 0.20 | 20.7 | 2:15 |
| 0.10 | BNS | 0.10 | 0.67 | 0.18 | 21.0 | 2:15 |
| 0.20 | BNS | 0.20 | 0.57 | 0.21 | 20.0 | 2:20 |

)* finely ground $CaSO_4$ dihydrate

It is clear from table 4 that combining the inventive cationic comb polymer 4 with the flow agents PCE 493, EPPR or BNS achieves a substantial water reduction in a natural clay-containing gypsum. The cationic comb polymer 4 provides effective masking of the clay particles and thereby inhibits their thickening effect as well as the performance loss of flow agents. It is further evident that using the cationic comb polymer 4 in combination with the phosphated condensation product EPPR provides a distinctly better water reduction than the combination of cationic comb polymer with PCE. At the same dosage rates for flow agents (0.10% in each case) and cationic comb polymer (0.10%) gives a water-to-gypsum value 3 points lower than that achieved in combination with the phosphated condensation product (0.62) than with the polycarboxylate ether (0.65).

The better performance of the combination of cationic comb polymer and phosphated condensation product EPPR over the combination with PCE is likewise clear from table 5. The overall dosage of the combination of cationic comb polymer with PCE 239 is 30% higher than the combination with phosphated condensation product EPPR.

TABLE 5

Flow behavior of combination of cationic comb polymer 4 with flow agents PCE 493 and/or EPPR (natural clay-containing gypsum C).

| Copolymer 4 Dosage [wt %] | Flow agent | Dosage [wt %] | Water-gypsum value | Accelerator [g] )* | Slump [cm] | Stiffening time [min:s] |
|---|---|---|---|---|---|---|
| 0.03 | PCE 239 | 0.10 | 0.735 | 0.27 | 21.1 | 2:15 |
| 0.03 | EPPR | 0.07 | 0.735 | 0.19 | 21.3 | 2:15 |

)* finely ground $CaSO_4$ dihydrate

TABLE 6

Combination of cationic comb polymer 1 with different flow agents in a natural clay-containing gypsum D

| Copolymer 1 Dosage [wt %] | Flow agent | Dosage [wt %] | Water-gypsum value | Accelerator [g] )* | Slump [cm] | Stiffening time [min:s] |
|---|---|---|---|---|---|---|
| 0.00 | — | 0.00 | 0.77 | 0.30 | 20.5 | 2:15 |
| 0.20 | BNS | 0.10 | 0.62 | 0.29 | 20.4 | 2:15 |
| 0.20 | MFS | 0.13 | 0.62 | 0.23 | 20.8 | 2:15 |
| 0.20 | EPPR | 0.06 | 0.62 | 0.21 | 20.3 | 2:20 |
| 0.20 | Lignin | 0.45 | 0.62 | 0.35 | 20.3 | 2:20 |

)* finely ground $CaSO_4$ dihydrate

The results in table 6 show that the inventive cationic comb polymer 1 can be combined with various flow agent types and/or commercially available plasticizers when used in natural clay-containing gypsums. The positively charged comb polymers of the invention do not harm the dispersing effect of negatively charged flow agents and there is also no negative interaction with the flow agents, such as gelling or precipitation for example.

TABLE 7

Stability of mixtures of anionic flow agents with a cationic comb polymer compared with the mixture with the cationic polymer without comb structure

| Flow agent | Cationic polymer | Flow agent quantity | Cationic polymer quantity | 1 d | 7 d | 28 d |
|---|---|---|---|---|---|---|
| PCE 493 | as per general formula IV | 0.30 | 1 | + | + | + |
| EPPR | as per general formula IV | 0.23 | 1 | + | + | + |
| BNS | as per general formula IV | 1 | 0.66 | + | + | + |
| PCE 493 | P-DADMAC | 0.60 | 1 | −/+ | − | − |
| EPPR | P-DADMAC | 0.50 | 1 | − | − | − |
| BNS | P-DADMAC | 1 | 0.66 | −/+ | − | − |

P-DADMAC (P-DADMAC available as FL 4250 RD from SNF SAS); + = clear solution, +/− = cloudy solution, − = phase separation As is apparent in table 7, the comb structure of the cationic polymers makes it possible to produce mixtures with anionic polymers that are stable, i.e., do not tend to phase separate. Evidently, the comb structure of the cationic polymers makes it possible to suppress the formation of complexes between anionic and cationic polymers on the basis of Coulomb interactions. Without the comb structure, immediate phase separation/clouding occurs on mixing the two polymers.

We claim:

1. A copolymer comprising:

a) 16 to 95 mol % of a cationic structural unit (A), b) 5 to 55 mol % of a macromonomeric structural unit (B), and c) up to 80 mol % of a structural unit (C), d) up to 80 mol % of a structural unit (D) other than the structural unit (C), wherein the structural unit (A) includes at least one unit of at least one of formula (I) or formula (II):

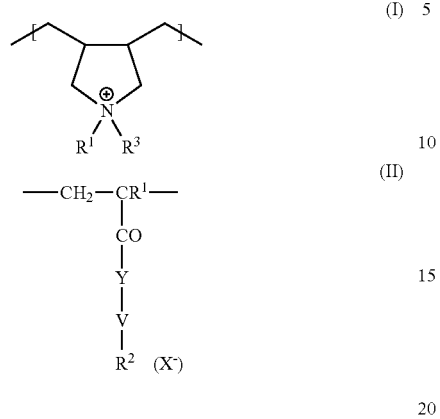

(I)

—CH$_2$—CR$^1$—
  |
  CO
  |
  Y
  |
  V
  |
  R$^2$ (X$^-$)

(II)

wherein
R$^1$ in each occurrence is the same or different and represents hydrogen and/or methyl,

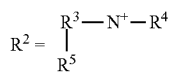

$$R^2 = \begin{array}{c} R^3-N^+-R^4 \\ | \\ R^5 \end{array}$$

R$^3$, R$^4$ and R$^5$ in each occurrence are the same or different and each independently represent hydrogen, an aliphatic hydrocarbonaceous moiety having 1 to 20 carbon atoms, a cycloaliphatic hydrocarbonaceous moiety having 5 to 8 carbon atoms and/or aryl having 6 to 14 carbon atoms or polyethylene glycol, Y in each occurrence is the same or different and represents oxygen, —NH and/or —NR$^3$, V in each occurrence is the same or different and represents —(CH$_2$)$_x$—,

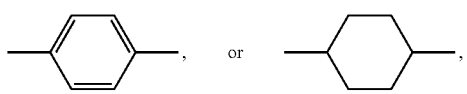

wherein
x in each occurrence is the same or different and represents an integer from 1 to 6, and
X in each occurrence is the same or different and represents a halogen atom, C$_1$- to C$_4$-alkyl sulfate and/or C$_1$- to C$_4$-alkyl sulfonate.

2. The copolymer according to claim 1, containing the cationic structural unit (A) in fractions of 20 to 95 mol %, and/or the macromonomeric structural unit (B) in fractions of 10 to 40 mol %.

3. The copolymer according to claim 1, wherein the structural unit (A) is a polymerization product of at least one monomer selected from the group consisting of [2-(acryloyloxy)ethyl]trimethyl ammonium chloride, [2-(acryloylamino)ethyl]trimethylammonium chloride, [2-(acryloyloxy)ethyl]-trimethylammonium methosulfate, [2-(methacryloyloxy)ethyl]trimethylammonium chloride, [2-(methacryloyloxy)ethyl]trimethylammonium methosulfate, [3-(acryloylamino)propyl]trimethylammonium chloride, [3-(methacryloylamino)propyl]-trimethylammonium chloride and diallyldimethylammonium chloride.

4. The copolymer according to claim 1, wherein the macromonomeric structural unit (B) is of formula (IIIa) or formula (IIIb) in the polymer:

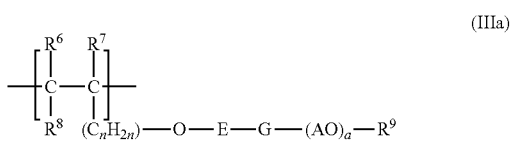

(IIIa)

wherein
R$^6$, R$^7$ and R$^8$ in each occurrence are the same or different and each independently represent H and/or branched or unbranched C$_1$-C$_4$ alkyl;
E in each occurrence is the same or different and represents branched or unbranched C$_1$-C$_6$ alkylene, cyclohexyl, CH$_2$—C$_6$H$_{10}$, ortho-, meta- or para-substituted C$_6$H$_4$ and/or a unit not present;
G in each occurrence is the same or different and represents O, NH and/or CO—NH with the proviso that when E is a unit not present, G is also a unit not present;
A in each occurrence is the same or different and represents C$_x$H$_{2x}$ wherein x=2, 3, 4 and/or 5 (preferably x=2) and/or CH$_2$CH(C$_6$H$_5$);
n in each occurrence is the same or different and represents 0, 1, 2, 3, 4 and/or 5;
a in each occurrence is the same or different and represents an integer from 5 to 350 (preferably 10-200);
R$^9$ in each occurrence is the same or different and represents H, a branched or unbranched C$_1$-C$_4$ alkyl, CO—NH$_2$, and/or COCH$_3$;

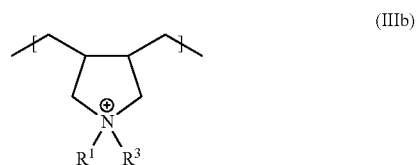

(IIIb)

wherein R$^3$ is as defined above and in the case of PEG the latter has 5 to 350 ethylene oxide units.

5. The copolymer according to claim 1, wherein the structural unit (B) is of formula (IV):

(IV)

—CH$_2$—CR$^1$—
     |
     Z wherein
Z in each occurrence is the same or different and represents —COO(C$_m$H$_{2m}$O)$_n$—R$^{10}$, wherein
R$^{10}$ in each occurrence is the same or different and represents H and/or C$_1$- to C$_4$-alkyl, wherein
R$^1$ is as defined above, and
m=2, 3, 4 or 5, preferably 2,
n=0 to 350 preferably 10 to 200.

6. The copolymer according to claim 1, wherein the structural unit (B) constitutes at least one representative of a monomer species selected from the group consisting of allyl polyethylene glycol monovinyl ether, methyl polyethylene glycol monovinyl ether, isoprenyl polyethylene glycol, polyethylene glycol vinyloxybutyl ether, polyethylene glycol-blockpropylene glycol vinyloxybutyl ether, methyl polyethylene glycol-block-propylene glycol allyl ether, polyethylene glycol methacrylate and methyl polyethylene glycol-block-propylene glycol allyl ether.

7. The copolymer according to claim 1, wherein the structural unit (C) is selected from polymerization product of at least one monomer species selected from representatives having the following formula (Va), formula (Vb) or formula (Vc):

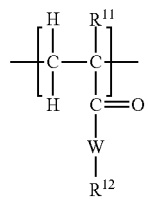

(Va)

wherein
$R^{11}$ in each occurrence is the same or different and represents H and/or a branched or unbranched $C_1$-$C_4$ group;
W in each occurrence is the same or different and represents O and/or NH;
$R^{12}$ in each occurrence is the same or different and represents a branched or unbranched $C_1$-$C_5$-monohydroxyalkyl group;

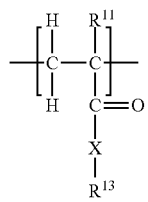

(Vb)

wherein
$R^{11}$ is as defined above,
X in each occurrence is the same or different and represents NH—$(C_nH_{2n})$ wherein n=1, 2, 3 or 4 and/or O—$(C_nH_{2n})$ wherein n=1, 2, 3 or 4 and/or a unit not present;
$R^{13}$ in each occurrence is the same or different and represents OH, $SO_3H$, $PO_3H_2$, O—$PO_3H_2$ and/or para-substituted $C_6H_4$—$SO_3H$, with the proviso that when X is a unit not present, $R^{13}$ represents OH;

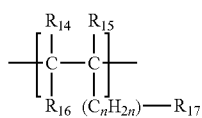

(Vc)

wherein
$R^{14}$, $R^{15}$ and $R^{16}$ are each the same or different and each independently represent H and/or a branched or unbranched $C_1$-$C_4$ alkyl group;
n in each occurrence is the same or different and represents 0, 1, 2, 3 and/or 4;
$R^{17}$ in each occurrence is the same or different and represents $(C_6H_5)$, OH and/or —$COCH_3$.

8. The copolymer according to claim 1, further containing a structural unit (D) which is represented by the following formula (VI):

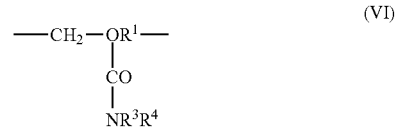

(VI)

wherein
$R^1$, $R^3$ and $R^4$ are each as defined above,
or represents diallylamine polyethylene glycol.

9. The copolymer according to claim 1, wherein the structural unit (D) constitutes at least one representative of a monomer species selected from the group consisting of acrylamide, methacrylamide, N-methylacrylamide, N,N-dimethylacrylamide, N-ethylacrylamide, N-cyclohexylacrylamide, N-benzylacrylamide, N-methylolacrylamide and N-tert-butylacrylamide.

10. The copolymer according to claim 1, wherein the structural unit (D) is of formula (VII):

(VII)

wherein
S in each occurrence is the same or different and represents —$COOM_k$ wherein $R^1$ is as defined above and M represents a cation from the series hydrogen, alkali metal ion, alkaline earth metal ion, alkaline earth metal ion, wherein k=valency.

11. The copolymer according to claim 1, wherein the structural unit (D) constitutes at least one representative of a monomer species selected from the group consisting of acrylic acid, sodium acrylate, methacrylic acid and sodium methacrylate.

12. The copolymer according to claim 1, further comprising up to 40 mol % of a structural unit (E) of formula (VIII)

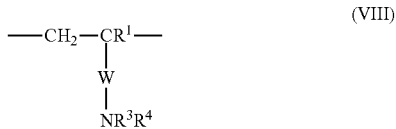

(VIII)

wherein
W in each occurrence is the same or different and represents —CO—O—$(CH_2)_x$, and
$R^1$, $R^3$, and $R^4$ are each as defined above and
x is = an integer from 1 to 6 and preferably 2 or 3.

13. The copolymer according to claim 12, wherein the additional structural unit (E) constitutes at least one representative of a monomer species selected from the group consisting of [3-(methacryloylamino)propyl]dimethylamine, [3-(acryloylamino)propyl]dimethylamine, [2-(methacryloyloxy)ethyl]dimethylamine, [2-(acryloyloxy)ethyl]dimethylamine, [2-(methacryloyloxy)ethyl]diethylamine and [2-(acryloyloxy)ethyl]diethylamine.

14. The copolymer according to claim 1, further comprising a structural unit (F) of the following formula (IX) or formula (X):

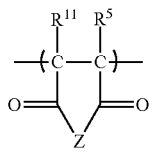
(IX)

wherein
$R^{11}$ is as defined above,
Z in each occurrence is the same or different and represents O or NH;

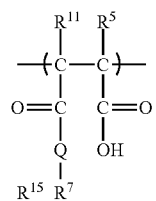
(X)

wherein
$R^{11}$ is as defined above,
Q=O or NH,
$R^{15}$ in each occurrence is the same or different and represents H, $(C_nH_{2n})$—$SO_3H$ wherein n=0, 1, 2, 3 or 4, $(C_nH_{2n})$—OH wherein n=0, 1, 2, 3 or 4; $(C_nH_{2n})$—$PO_3H_2$ wherein n=0, 1, 2, 3 or 4, $(C_nH_{2n})$—$OPO_3H_2$ wherein n=0, 1, 2, 3 or 4, $(C_6H_4)$—$SO_3H$, $(C_6H_4)$—$PO_3H_2$, $(C_6H_4)$—$OPO_3H_2$ and/or $(C_mH_{2m})_e$—O-$(A'O)_\alpha$—$R^{16}$ wherein m=0, 1, 2, 3 or 4, e=0, 1, 2, 3 or 4, $A'=C_{x'}H_{2x'}$ wherein x'=2, 3, 4 or 5 or $CH_2C(C_6H_5)H$—, α=an integer from 1 to 350 wherein $R^{16}$ in each occurrence is the same or different and represents a branched or unbranched $C_1$-$C_4$ alkyl group.

15. An admixture for aqueous building product systems comprising water, an inorganic binder and the copolymer of claim 1.

16. An admixture according to claim 15, wherein the inorganic binder is selected from the group consisting of a calcium sulfate-based binder.

17. An admixture according to claim 15, wherein the inorganic binder is selected from the group consisting of calcium sulfate hemihydrate, gypsum or anhydrite and lime.

18. An admixture according to claim 15, further comprising a clay constituents.

19. An admixture according to claim 15, wherein the inorganic binder is calcium sulfate.

20. An admixture according to claim 15, wherein the admixture is a mortar or a rendering system.

21. A gypsum board comprising the admixture according to claim 15.

22. An admixture according to claim 15, further comprising a dispersant agent that is a member selected from the group consisting of a polycarboxylate ether, a polycarboxylate ester, a phosphorus-containing polycondensation product, a naphthalenesulfonate-formaldehyde condensation product and a melaminesulfonate-formaldehyde condensation product.

23. A formulation comprising the copolymer according to 1 and a setting retarder for a calcium sulfate-based building product system.

24. A formulation comprising the copolymer of claim 1 and a chelating agent.

25. A formulation comprising the copolymer of claim 1 selected from the group consisting of ethylenediaminetetraacetate, diethylenetriaminpentaacetate, a phosphate, a phosphonate, a sugar, tartaric acid, succinic acid, citric acid, a gluconate, a maleic acid and a polyacrylic acid, and a salt thereof.

26. A formulation comprising the polymer of claim 1 and a chelating agent in an amount of not more than 10% by weight, based on the solids content of the formulation.

27. The copolymer according to claim 1, containing the cationic structural unit (A) in a fraction of from 40 to 80 mol %.

28. The copolymer according to claim 1, containing the macromonomeric structural unit (B) in a fraction of 10 to 40 mol %.

* * * * *